Figure 1:
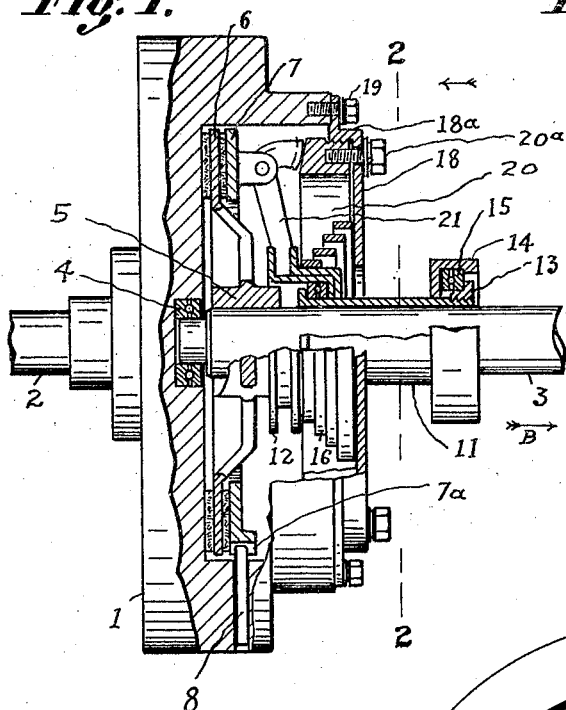

C. G. WOOD.
FRICTION CLUTCH.
APPLICATION FILED OCT. 3, 1919.

1,402,129.

Patented Jan. 3, 1922.

INVENTOR
CLARENCE G. WOOD.
By Wyman L Ryan
ATTORNEY.

UNITED STATES PATENT OFFICE.

CLARENCE G. WOOD, OF MUNCIE, INDIANA.

FRICTION CLUTCH.

1,402,129. Specification of Letters Patent. Patented Jan. 3, 1922.

Application filed October 3, 1919. Serial No. 328,129.

*To all whom it may concern:*

Be it known that I, CLARENCE G. WOOD, a citizen of the United States, residing at Muncie, in the county of Delaware and State of Indiana, have invented certain new and useful Improvements in Friction Clutches, of which the following is a specification.

This invention relates to improvements in friction clutches. A clutch of the type to which the present invention relates comprises a driving element, a driven element, a casing fixed to the driving element and embracing the driven element, a thrust or clamping ring mounted within and movable longitudinally of the casing, means and connections within the casing adapted to hold the thrust ring at frictional engagement with the driving element, and operable to retract the thrust ring from said engagement and to retain the ring at such position of disengagement.

Objects of the invention are to provide a clutch of this kind which will be dependable in all its functions, durable, rugged, and not liable to get out of repair or adjustment, and which clutch will be simple in construction and economical of manufacture.

Specific features of the invention are comprised in the new construction, combination and arrangement of parts whereby a positive and reliable retention of the thrust ring at its proper position, and the shifting of the thrust ring from the engaged to the disengaged positions is had; and whereby adjustment of the device to compensate for wear, may be easily made.

The present invention is embodied in the new construction, combination and arrangement of parts shown in the annexed drawings, and described in the following specification. The invention is defined in the appended claims.

In the drawings, the several parts of the invention are identified by suitable characters of reference applied thereto in the different views, in which—

Figure 3:
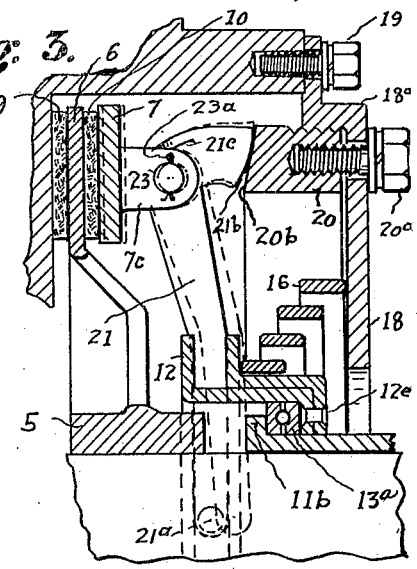
Figure 2:
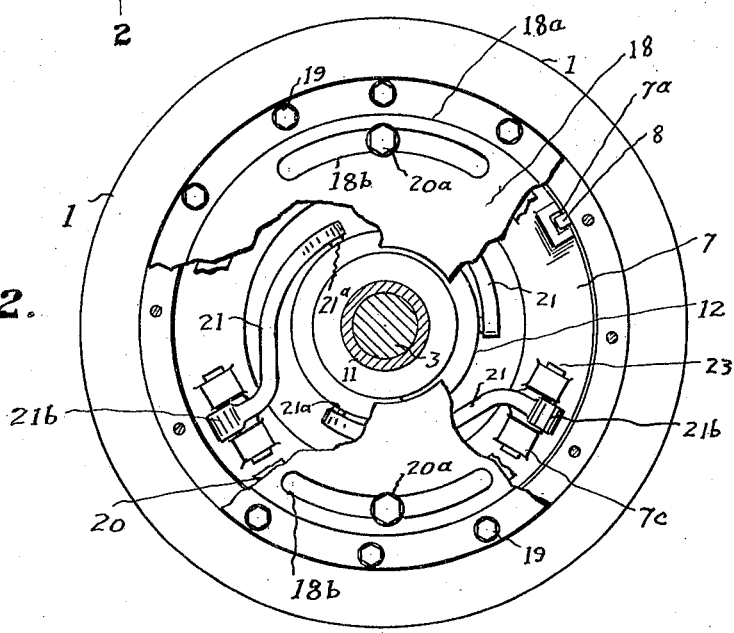

Figure 1 is a central longitudinal sectional view of my improved friction clutch, parts thereof being shown in elevation.
Figure 2 is a transverse sectional view taken on the line 2—2 in Figure 1, and as seen in the direction indicated by the arrow, portions of the casing and of the bearing ring being broken away.
Figure 3 is an enlarged detail view of one of the actuating levers, its connected parts being in the positions occupied when the clutch is thrown out.

The usual fly wheel 1 is carried on the motor driving shaft 2 and is recessed as shown in Figure 1. An anti-friction bearing 4 which is properly seated, constitutes a bearing for the end of the driven shaft 3. A power transmitting member whose hub 5 is secured upon the driven shaft 3, has its annular portion 6 of the suitable diameter and thickness shown, and is designated as the friction disk.

The thrust ring 7 is supported in the recess of the fly wheel and adjacent to the friction disk; this thrust ring is free to move longitudinally, but is held against rotation relatively, of the fly wheel by the studs 8 which loosely engage the groove 7$^a$ of the thrust ring.

Friction rings 9 and 10, made preferably of fiber, are provided; the ring 9 being located between the inner face of the fly wheel and the face of the friction disk, and the other being disposed between the face of the friction disk and the thrust ring 7. While these friction rings could be secured to the fly wheel, friction disk, or to the thrust ring, it is preferable that they may merely rest between the opposed faces of these members.

A collar 13, which is threaded upon the end of the loose sleeve 11, has arrangement with a yoke throw-out-ring 14 by antifriction bearing 15. The said throw-out-ring does not rotate and is adapted to be moved longitudinally of the main shaft 3, by a suitable clutch lever (not shown). When the throw-out-ring is moved toward the left (viewing the drawing) to throw in the clutch, the collar 12 is caused to follow the flange 11$^b$ of the said sleeve 11, by a spiral spring 16 which is interposed for the purpose, between the inner face of the casing and the adjacent face of the collar 12. The collar 12 is made of two steel circular shells one shrunk onto the other and the two then being secured together by bolts 12$^c$, the collar so formed being of internal form to rest in the proper engagement with the ball race 13$^a$. A construction feature of my invention is the casing 18 made of sheet steel and capable of being formed by stamping. This casing shell is disk shaped having ample central opening as shown, and the shoulder 18$^a$. The rim portion of the casing is machined to fit at position on the face of the fly wheel and is secured thereto by bolts 19 so that the casing moves with the fly wheel and the shaft 2.

The construction thus far described, is in a general way common to known clutches of the type shown herein. The specific improvements made in the casing construction and arrangement, together with the new construction, combination and arrangement of parts disposed within the casing and operable between the casing, the collar 12, and the thrust ring, are features of our present invention.

The inner surface of the shoulder 18$^a$ is threaded, as shown in the drawings, and there is thus provided support for a turned machined ring 20. The necks of two securing bolts 20$^a$ occupy positions in arcuate slots 18$^b$ in the casing shell, as shown in Figure 2. Sufficient clearance at the threaded portion of this ring 20 makes practicable the easy placement of the ring at adjusted position, and by tightening the bolts 20$^a$ the said ring is held securely. The function of the slightly inclined annular face 20$^b$ will be presently referred to.

In combination with the thrust ring 7, the collar 12 and the adjusting-bearing ring 20, are arranged a set of levers 21, 21, and 21, each being of the form and structure, as plainly shown in Figures 1 and 2. The power arms of these levers are of the curvature as shown in Figure 2, their ends being rounded and provided with roller studs 21$^a$ that have loose bearing in the groove of the pull collar 12. The weight arms each have the machined rounded faces 21$^b$ and which have bearing directly against the inclined face 20$^b$ of the ring 20. The levers 21 are retained at tightly fitted position between lugs 7$^c$ therefor that are formed on the thrust ring, and are fulcrumed on the pins 23 that are properly retained in the lugs 7$^c$.

The several parts of my improved friction clutch when at the thrown in position or at driving engagement, occupy the assembled relative positions as shown at Figure 1. The pull collar 12 by force of the spring 16, is urged to the left, the face 21$^b$ of the lever 21 being at the bearing contact with the face 20$^b$ of ring 20 and in this position exerts a continuous pressure at the thrust ring. The powerful effect of the levers 21 formed with the peculiar weight arms and their faces 21$^b$ operating in combination with the inclined face 20$^b$, is to maintain the thrust ring normally at tight clutching engagement; at the same time, it is apparent that the release of this powerful pressure is effectively and quickly accomplished by the slight shifting of the collar 12. The connection of the lever at the lugs 7$^c$ while tight fitting permits the slight movement of the lever on its pin 23, so that while the thrust ring is positively carried by the levers and is capable of being moved into and out of engagement with the friction ring, there is no possibility of the bearing end of the lever sticking cramping or clinging to the bearing ring face. The form of the bearing faces 21$^b$ and 20$^b$ relatively are such, that when the pull collar 12 is pulled to the right, (thrown out of position) there is the positive and easy release of the several parts from frictional engagement.

Besides the advantages afforded by this direct and simple construction and arrangement of parts, our invention makes possible the easy taking up for wear so that the clutch may always be maintained at perfect working condition and adjustment. By loosening the bolts 20$^a$, (see Figure 2) the ring 20 may be shifted, thereby varying the distance between the face of the lever 21 and the face of the friction disk 6. It will be understood that any desirable construction of clamping feature at the lugs 7$^c$ of the thrust ring may be used. In the preferred form shown, there is provided the fulcrum pin 23 of ample size having bearing-fit connection with the lever 21 and drive-fit connections with the lug 7$^c$. The usual cotters 23$^a$ are used for holding pins 23 in place. Inclined raised faces 21$^c$ which are carried by the sides of the levers adjacent their pivotal points assume tight engagement with the inner sides of the lugs 7$^c$ immediately when the lever is moved thereby causing the thrust ring 7 to move outwardly out of contact with friction ring 10 when the inner ends of the lever are moved outwardly. With the arrangement as described it is apparent that when the pull collar 12 is moved in the direction indicated by the arrow, B in Figure 1, the face 21$^b$ of the lever will bear and move against the face 20$^b$ of the bearing ring 20, the thust ring 7 being disengaged from the friction ring 10, as shown by the dotted lines in Figure 3, the distance of the stroke of the levers 21 and of the fulcrum pins 23, being about one-half inch and three thirty seconds of one one inch, respectively.

What I claim as my invention, and desire to secure by Letters Patent, is—

1. A friction clutch comprising a driving element and a driven element, a casing carried by the driving element, the driven element disposed within the casing and having a bearing therein, a drive plate carried by the driven element and adapted to be forced into frictional engagement with the casing, a clamping ring adjacent the drive plate, means whereby said clamping ring may move longitudinally in the casing, an adjustable ring carried by the casing and spaced from the clamping ring, said adjustable ring having its inner face outwardly bevelled, levers pivoted to the clamping ring, said levers having substantially right angled portions terminating in eccentric camming surfaces engaging the bevelled surface of the adjusting ring, a slidable sleeve carried by the driven member and provided with an annular groove, the arms of the pivoted levers extending inwardly and segmentally formed and terminating in lugs radially disposed in relation to the driven member and disposed in the groove of the sliding collar at substantially a right angle position to the pivotal points of the levers.

2. A clutch comprising a driving member having a casing and a driven member having a bearing in said casing, a clamping member disposed in said casing and adapted to force the driven member into frictional engagement with the driving member, levers pivoted to the clamping member, and adjusting ring disposed adjacent the clamping member and spaced therefrom, said levers being provided with arms having their ends eccentric to the pivotal points of the levers and engaging the adjusting ring, said adjusting ring having its inner face outwardly bevelled, a slidable sleeve on the driven member provided with an annular groove, the inner ends of said levers being disposed in the annular groove of the slidable sleeve at points radially disposed in relation to the sleeve and at right angles to the pivotal points of the levers.

3. The combination with a clutch comprising a driving member having an inclined surface, a driven member, a clamping ring for forcing the driving and driven members into frictional engagement and a slidable sleeve on the driven member, of means for moving said clamping ring longitudinally, said means comprising levers pivoted to the clamping ring and having their inner ends disposed adjacent the driven member and cooperating with the slidable sleeve, said levers adjacent their pivotal points being provided with substantially right angled arms having their ends eccentric with the pivotal points of the levers and cooperating with the inclined surface, said arms being so constructed that upon an outward movement of the sleeve, the eccentric surfaces will hug the inclined surface and move the clamping ring out of frictional engagement.

In testimony whereof I affix my signature.

CLARENCE G. WOOD.